(12) United States Patent
Takahashi et al.

(10) Patent No.: US 9,374,537 B2
(45) Date of Patent: Jun. 21, 2016

(54) RADIATION MEASUREMENT APPARATUS AND RADIATION MEASUREMENT METHOD

(71) Applicant: HITACHI ALOKA MEDICAL, LTD., Mitaka-shi, Tokyo (JP)

(72) Inventors: Isao Takahashi, Tokyo (JP); Naoyuki Yamada, Tokyo (JP); Hisaki Mori, Tokyo (JP); Tatsuo Izumida, Tokyo (JP)

(73) Assignee: Hitachi Aloka Medical, Ltd., Tokyo (JP)

( * ) Notice: Subject to any disclaimer, the term of this patent is extended or adjusted under 35 U.S.C. 154(b) by 328 days.

(21) Appl. No.: 14/019,047

(22) Filed: Sep. 5, 2013

(65) Prior Publication Data

US 2014/0085481 A1    Mar. 27, 2014

(30) Foreign Application Priority Data

Sep. 21, 2012  (JP) ................................. 2012-207680

(51) Int. Cl.
*G01T 1/02* (2006.01)
*H04N 5/30* (2006.01)

(52) U.S. Cl.
CPC ....................................... *H04N 5/30* (2013.01)

(58) Field of Classification Search
CPC ........... G01T 1/20; G01T 7/00; G01T 1/2921; G01V 5/0075
See application file for complete search history.

(56) References Cited

U.S. PATENT DOCUMENTS

| 5,204,533 A * | 4/1993 | Simonet .................... G01T 7/00 250/361 R |
| 6,782,123 B1 * | 8/2004 | Guillon .................. G01C 11/06 250/336.1 |
| 2007/0221854 A1 | 9/2007 | Shirakawa |
| 2010/0168947 A1 * | 7/2010 | Winso .................. G01V 5/0075 701/23 |
| 2011/0115793 A1 * | 5/2011 | Grycewicz ............ G06T 3/4069 345/428 |
| 2011/0170778 A1 | 7/2011 | Le Goaller et al. |
| 2014/0299784 A1 | 10/2014 | Kobayashi et al. |

FOREIGN PATENT DOCUMENTS

| CN | 102057299 A | 5/2011 | |
| EP | 2 380 496 A1 | 10/2011 | |
| FR | WO 9429748 A1 * | 12/1994 | ............. G01T 1/178 |
| JP | 2001-305233 A | 10/2001 | |
| JP | 2003-532870 A | 11/2003 | |
| JP | 2006-46951 A | 2/2006 | |
| JP | 2006-201086 A | 8/2006 | |
| JP | 2007-89674 A | 4/2007 | |
| JP | 2011-229900 A | 11/2011 | |
| WO | 01/79884 A2 | 10/2001 | |
| WO | 2013/105519 A1 | 7/2013 | |

* cited by examiner

*Primary Examiner* — Kiho Kim
(74) *Attorney, Agent, or Firm* — Mattingly & Malur, PC (57) ABSTRACT

A radiation measurement apparatus includes: a radiation detector which detects incoming radiations; a measurement processor which measures a distribution of a radiation source in an object on the basis of detection signals inputted from the radiation detector; an optical camera which takes an optical image of an object existing in the field of view; a controller which generates synthesized images by superimposing the distribution of the one or more radiation sources and the optical image; a rotation unit which changes the objective field of radiation measurement by automatic or manual rotation; and a controller which causes a display unit to display the multiple synthesized images in association with rotation angles in the automatic or manual rotation.

12 Claims, 8 Drawing Sheets

RADIATION MEASUREMENT APPARATUS AND RADIATION MEASUREMENT METHOD

CROSS-REFERENCE TO RELATED APPLICATION

This application claims the foreign priority benefit under 35 U.S.C. §119 of Japanese Patent Application No. 2012-207680, filed on Sep. 21, 2012, the entire contents of which are incorporated herein by reference.

BACKGROUND OF THE INVENTION

1. Field of the Invention

The present invention relates to a radiation measurement apparatus and a radiation measurement method for measuring the indoor or outdoor radiation dose.

2. Description of the Related Art

The survey meters are widely used as means for measuring a spatial dose rate at a certain location. The survey meters detect and count the radiations incoming from the circumference by using a scintillation detector, a semiconductor detector, or the like, and obtain the spatial dose rates of the radiations in consideration of the detection efficiency. The spatial dose rate means the radiation dose per unit time (in μSv/h) in a space of interest. The radiations include gamma rays, beta rays, neutron rays, and the like.

When measurement is performed by using a survey meter, it is possible to recognize the level of the spatial dose rate at the location of the radiation measurement.

Incidentally, attention to the radiation has been increasing in recent years, and there are needs for lowering the spatial dose rate at a certain location for the purpose of improvement in work or life environment. In order to lower the spatial dose rate, it is necessary to identify one or more radiation sources which greatly affect the spatial dose rate at the location, and remove or shield the radiation source. Although the survey meters can measure the spatial dose rate, the survey meters cannot detect the incoming directions of the radiations (i.e., the survey meters cannot determine the positions of the radiation sources).

Japanese Patent Laid-Open No. 2006-201086 (hereinafter referred to as JP2006-201086A) discloses a radiation directionality detector including a composite scintillator which is formed in a cylindrical shape by combining sectorial scintillators each having a central angle of 120 degrees, and photodetectors being arranged with the composite scintillator and having light-receiving faces optically coupled to the composite scintillator.

In addition, Japanese Patent Laid-Open No. 2001-305233 (hereinafter referred to as JP2001-305233A) discloses a gamma-ray-source imaging device in which a filter transmitting only gamma rays having energy equal to or greater than a predetermined value is arranged on the front side of a gamma-ray detector in a chassis.

However, according to the technique disclosed in JP2006-201086A, in the case where radiation sources of an identical nuclide exist at multiple locations, it is impossible to accurately determine the incident directions of the radiations from the respective radiation sources.

In addition, according to the technique disclosed in JP2001-305233A, in the case where a strong radiation source exists outside the field of view of the gamma-ray-source imaging device, there is a possibility that the existence of the strong radiation source cannot be detected.

SUMMARY OF THE INVENTION

An aspect of the present invention is to provide a radiation measurement apparatus and a radiation measurement method which can appropriately determine the positions of radiation sources.

An aspect of the present invention provides a radiation measurement apparatus, wherein a rotation unit which changes the objective field of radiation measurement by automatically or manually rotating the field of view, and causing a display unit to display, in association with rotation angles of the rotation unit, multiple synthesized images which are generated by a synthesized-image generation unit.

An aspect of the present invention provides a radiation measurement apparatus comprising:

a radiation detector which detects incoming a radiation in a field of view thereof;

a measurement processing unit which measures a distribution of a radiation source in an object on the basis of a detection signal inputted from the radiation detector;

an optical camera which takes an optical image of the object existing in the field of view;

a synthesized-image generation unit which generates each of multiple synthesized images by superimposing the distribution of the radiation source measured by the measurement processing unit and the optical image inputted from the optical camera;

a rotation unit which changes an objective field of radiation measurement by automatically or manually rotating the field of view; and a display control unit which controls a display unit to display, in association with rotation angles of the rotation unit, the multiple synthesized images by the synthesized-image generation unit.

According to the present invention, it is possible to provide a radiation measurement apparatus and a radiation measurement method which can appropriately determine the positions of radiation sources.

DETAILED DESCRIPTION OF THE INVENTION

Embodiment

The radiation measurement apparatus and the radiation measurement method according to the embodiment of the present invention are explained below with reference to accompanying drawings.

Figure 1:
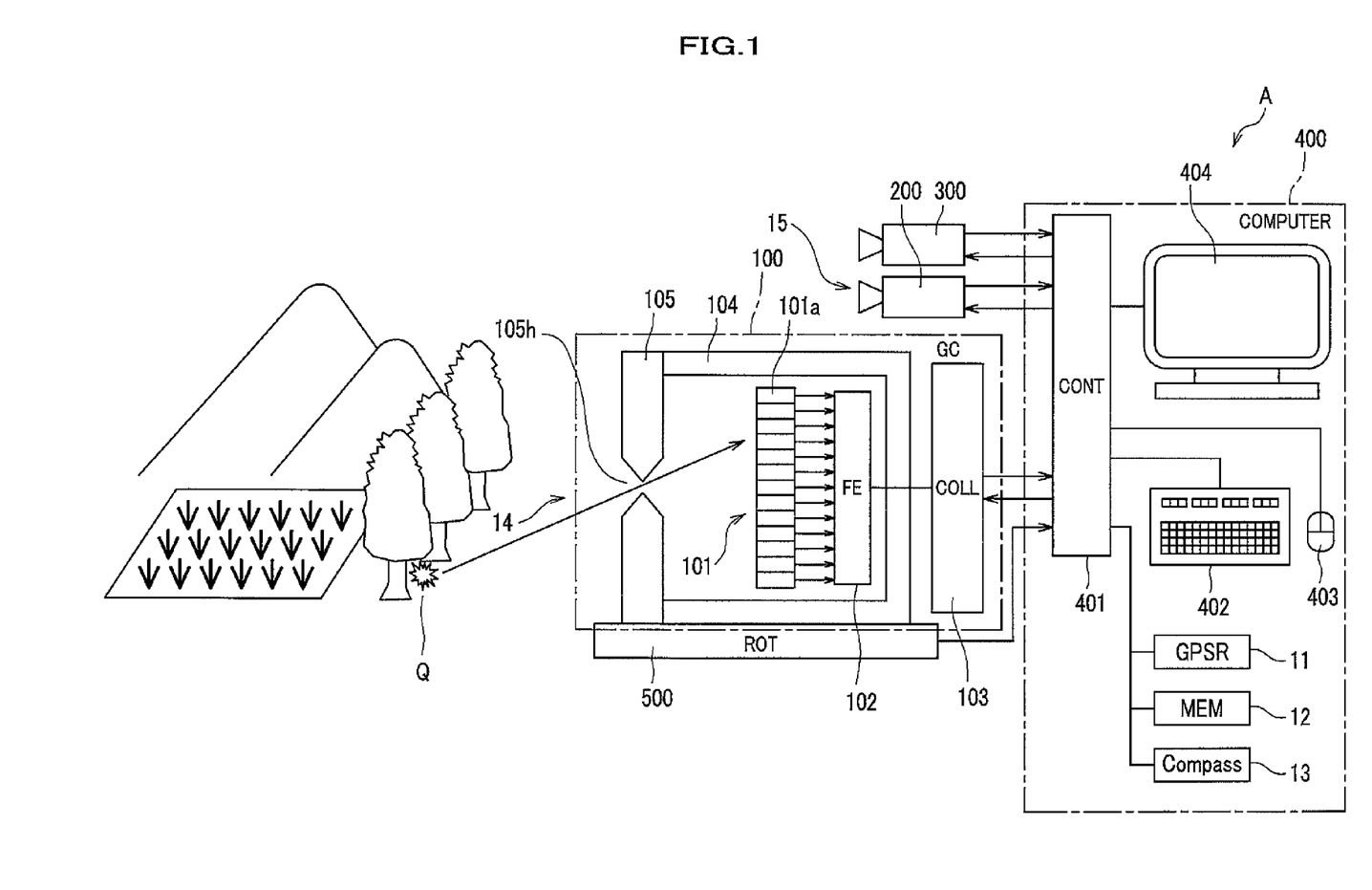
FIG. 1 is a diagram schematically illustrating the configuration of a radiation measurement apparatus according to an embodiment of the present invention.

FIG. 1 is a diagram schematically illustrating the configuration of the radiation measurement apparatus according to the embodiment of the present invention. In the following explanations, a radiation measurement apparatus A includes a gamma camera 100 for measurement of gamma rays is taken as an example.

As illustrated in FIG. 1, the radiation measurement apparatus A is constituted by a gamma camera 100, an optical camera 200, a distance meter 300, and a computer 400.

<Gamma Camera>

The gamma camera 100 includes a radiation detector 101, a front-end circuit 102, a collection circuit 103, a shield 104, and a pinhole collimator 105.

The radiation detector 101 is a position-sensitive detector which detects gamma rays incoming into the radiation detector 101, and in which multiple radiation detector elements 101a are two-dimensionally arrayed (in an m×n matrix).

In order to reduce the size and weight of the gamma camera 100, the radiation detector 101 is preferably small in size. Therefore, it is preferable that the multiple radiation detector elements 101a constituting the radiation detector 101 be formed of semiconductors, which do not need optical devices.

The semiconductor elements of, for example, silicon, germanium, CdTe, CdZnTe, TlBr, $HgI_2$, GaAs, or the like can be used as the radiation detector elements 101a. The radiation detector using semiconductor elements as radiation detector elements as above are called semiconductor radiation detectors.

When a gamma ray enters one of the semiconductor elements (i.e., the radiation detector elements 101a), an interaction occurs between the gamma ray and the semiconductor element, and the semiconductor element outputs a pulse-shaped electric signal to the front-end circuit 102.

For example, each of the radiation detector elements 101a may be a combination of a crystal scintillator and an optical device, where the crystal scintillator may be formed of NaI (Tl), CsI(Tl), GSO(Ce), BGO, or the like, and the optical device may be a photomultiplier, a photodiode, an avalanche photodiode, a Geiger-mode avalanche photodiode, or the like.

The front-end circuit 102 associates, with each electric signal inputted from the radiation detector 101, an element ID of one of the radiation detector elements 101a which detects the corresponding gamma ray. Then, the front-end circuit 102 outputs the electric signal and the associated element ID to the collection circuit 103 in the following stage. That is, a unique element ID is assigned to each of the radiation detector elements 101a. Since the element ID of the radiation detector element 101a is associated with event information (including timestamp information) indicating that a gamma ray is detected, it is possible to determine which one of the radiation detector elements 101a in the aforementioned m×n matrix detects the gamma ray.

The collection circuit 103 successively performs operations for preamplification, waveform shaping, peak holding, analog-to-digital conversion, and the like on the electric signal inputted from the front-end circuit 102 so as to convert the electric signal to a pulse-height value. The collection circuit 103 accumulates the converted data (with which the element ID, the detection time, the radiation energy, and the like are associated), and outputs the accumulated data to a controller 401 in the computer 400.

In FIG. 1, an interface existing between the collection circuit 103 and the controller 401 is not shown.

The shield 104 is provided for preventing injection, into the radiation detector 101, of gamma rays other than the gamma rays passing through an aperture 105h. The shield 104 is formed of a material superior in the capability of shielding from the gamma rays, such as lead and tungsten. In addition, an internal space having a rectangular shape is formed when the pinhole collimator 105 is arranged at the front end (the end on the side facing the object of gamma-ray measurement) of the shield 104.

In addition, the radiation detector 101 is arranged at the rear end of the internal space of the shield 104. Although the case in which the shield 104 has a box-like shape is illustrated in FIG. 1, the shield 104 may have another shape. (For example, the shield 104 may have a conical or quadrangular pyramidal shape on the front side and a rectangular shape on the rear side.)

The pinhole collimator 105 is fitted onto the front end of the shield 104, and the aperture (pinhole) 105h is formed at the center of the pinhole collimator 105. The diameter of the aperture 105h can be controlled by the controller 401, and the sensitivity and the position resolution in the gamma-ray detection can be controlled according to the diameter. There is a tendency that the position resolution improves and the detection sensitivity decreases with decrease in the diameter.

When gamma rays emitted from a radiation source Q are injected into the inside of the shield 104 through the aperture 105h, a part of the radiation detector elements 101a detect the gamma rays, and an image is formed over the m×n matrix of the radiation detector elements 101a. Then, pulse-shaped electric signals are outputted from the radiation detector elements 101a in correspondence with the above image.

In the example illustrated in FIG. 1, the gamma rays emitted from the vicinity of the ground are detected by ones of the radiation detector elements 101a located on the upper side of the radiation detector 101, and the gamma rays emitted from the left side with respect to the orientation of the gamma camera 100 are detected by ones of the radiation detector elements 101a located on the right side of the radiation detector 101. That is, the distribution of the gamma-ray sources detected by the radiation detector 101 is vertically and horizontally inverted.

The radiation detector 101 has a field of view 14 which is a range where the radiation detector 101 can detect a source of radiation as an image.

The front-end circuit 102 associates the pulse-shaped electric signals outputted from the radiation detector 101, with the corresponding element IDs, and outputs the pulse-shaped electric signals and the corresponding element IDs to the controller 401 in the computer 400. The processing performed by the controller 401 will be explained later.

<Optical Camera>

The optical camera 200 is, for example, a CCD (charge coupled device) camera, shoots the object of measurement, and acquires an optical image. The optical camera 200 is attached to the shield 104 in such a manner that the optical camera 200 rotates with the shield 104 according to the rotation of the rotation unit 500.

In addition, the optical camera 200 and the gamma camera 100 are arranged to shoot an identical imaging range in order to determine the locations of gamma sources by superimposing by the controller 401 the imaged result (the optical image) obtained by the optical camera 200 and the measured result (the distribution of radiation sources) obtained by the gamma camera 100.

The optical camera 200 takes an optical image of objects existing in the field of view of the gamma camera 100 through the aperture 105h, and outputs the optical image of the objects to the controller 401.

The optical camera 200 has a field of view 15 which is a range where the optical camera can take an image.

<Distance Meter>

The distance meter 300 measures the distance to an object in an objective field corresponding to the field of view of the pinhole optical system (i.e., the field of view of the aperture 105h and the optical camera 200). The distance meter 300 is attached to the shield 104 in such a manner that the distance meter 300 rotates together with the shield 104 according to the rotation of the rotation unit 500 as explained later.

The distance meter 300 measures the distance to the object existing in the above field of view by scanning each region in the field of view of the gamma camera 100, and outputs distance information indicating the measured distance to the controller 401. The distance information is used as necessary when the controller 401 corrects the data of the gamma-ray measurement inputted from the gamma camera 100 and calculates radiation intensity. For example, a laser range-finder can be used as the distance meter 300.

Alternatively, since the distance can be detected at the time of focusing the optical camera 200, the distance meter 300, which is independently arranged, may be dispensed with.

In addition, it is possible to obtain the absolute intensity of the radiation source Q, for example, the becquerel value or the surface concentration of contamination (the number of becquerels per unit area) by combining the contribution to the spatial dose rate at the measurement point which is calculated by the controller 401, which will be explained later. Further, the above information may be displayed by an image display device 404, which will also be explained later.

<Computer>

A common personal computer can be used as the computer 400. The computer 400 includes the controller 401, input devices (including a keyboard 402 and a mouse 403), and the image display device 404. In addition, the computer 400 is connected to the gamma camera 100, the optical camera 200, and the distance meter 300 through, for example, a USB interface (not shown).

Figure 8:
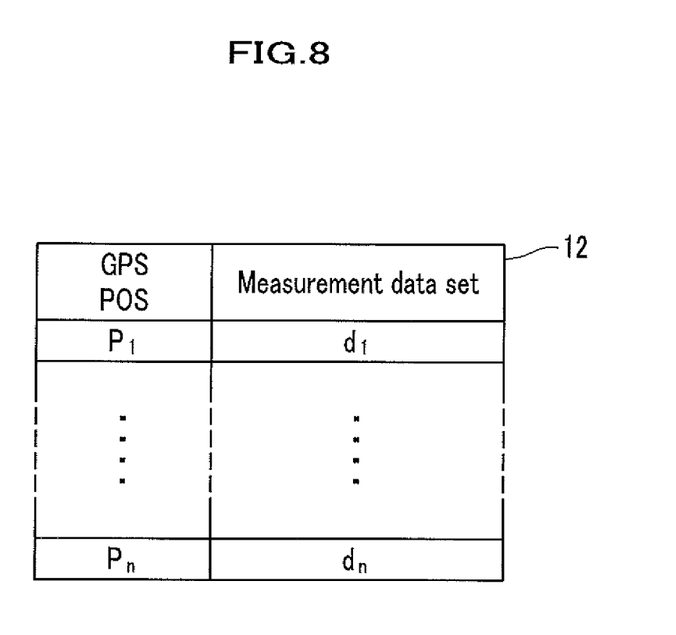
FIG. 8 is a table illustrating data in a storage unit shown in FIG. 1.

In addition, the computer 400 is connected to a GPS receiver 11 for receiving a GPS signal and a storage unit (memory: MEM) 12. FIG. 8 shows a format of storing a GPS position data P1 to Pn (n being a natural number) and a measurement data set d1 to dn correspondingly. The GPS receiver 11 and the compass 13 may be located on the shield 100.

Hereinbelow, the functions of the controller 401 are explained.

Figure 2:
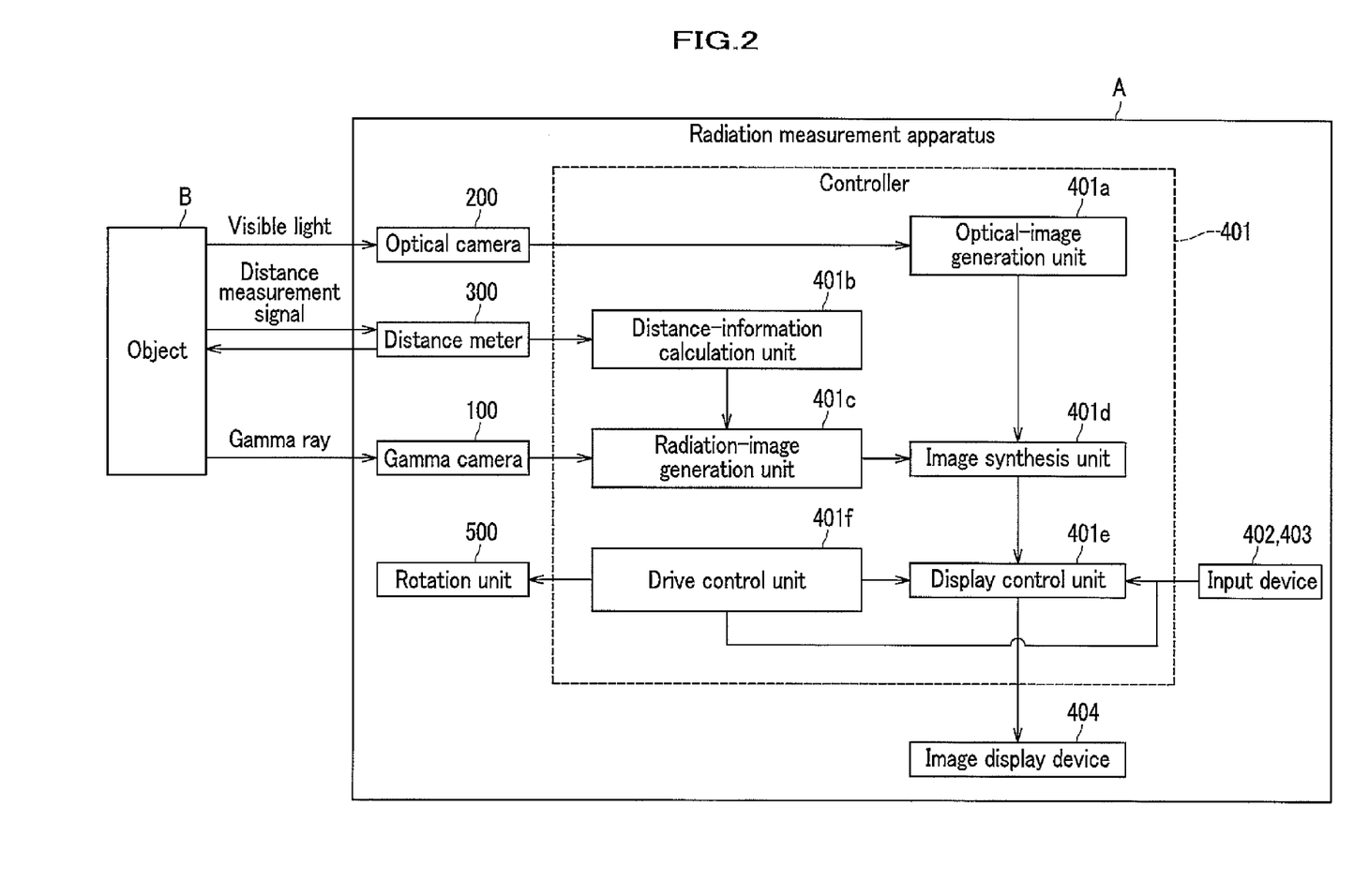
FIG. 2 is a block diagram schematically illustrating the construction of the radiation measurement apparatus according to the embodiment of the present invention, where the construction of a controller is illustrated in detail.

FIG. 2 is a block diagram schematically illustrating the construction of the radiation measurement apparatus A, where the construction of the controller 401 is illustrated in detail. As illustrated in FIG. 2, the controller 401 includes an optical-image generation unit 401a, a distance-information calculation unit 401b, a radiation-image generation unit 401c, an image synthesis unit 401d, a display control unit 401e, and a drive control unit 401f.

The optical-image generation unit 401a generates bit-map data of the optical image on the basis of the data inputted from the optical camera 200, and outputs the bit-map data to the image synthesis unit 401d.

The distance-information calculation unit 401b generates the distance information indicating the distance to the object, on the basis of the data inputted from the distance meter 300, and outputs the distance information to the radiation-image generation unit 401c.

The radiation-image generation unit 401c determines the incident direction of the gamma ray (corresponding to the element ID of the radiation detector element 101a which detects the gamma ray) on the basis of the element ID of the radiation detector element 101a which detects the gamma ray. Then, the radiation-image generation unit 401c generates radiation information on the basis of the information inputted from the gamma camera 100 and the distance information inputted from the distance-information calculation unit 401b. The locations (in the array) of the radiation detector elements 101a are stored in a storage unit (not shown) in advance in correspondence with the above element IDs.

The radiation-image generation unit 401c performs the above operations every time a gamma ray is injected into the radiation detector 101. Thus, the radiation-image generation unit 401c can calculate the counting rate for each gamma-ray incident direction (i.e., for each of the radiation detector elements 101a), where the counting rate is the number of detected gamma rays per unit time.

In addition, the radiation-image generation unit 401c generates a gamma-ray image on the basis of the gamma-ray incident direction, the counting rate, and the like. For example, the gamma-ray image is an image in which the incident directions of gamma rays are two-dimensionally indicated and the incident radiation doses of gamma rays are indicated by the color tone. Thus, the user can visually recognize how many gamma rays are injected (come) from which direction (i.e., the locations of radiation sources and the radiation doses from the radiation sources).

Further, the radiation-image generation unit 401c calculates the energy and the radiation intensity of the gamma rays using the diameter of the pinhole in the pinhole collimator 105, the detection efficiency of the radiation detector 101, and the distance information inputted from the distance-information calculation unit 401b as necessary. Then, the radiation-image generation unit 401c converts the above radiation intensity to the spatial dose rate. Thus, the radiation-image generation unit 401c can calculate the contributions of the radiation sources to the spatial dose rate at the measurement point.

Furthermore, the distance meter 300, the distance-information calculation unit 401b, and the radiation-image generation unit 401c constitute a measurement processing unit, which measures a distribution of one or more radiation sources in one or more objects on the basis of detection signals inputted from the radiation detector.

The image synthesis unit 401d (corresponding to the aforementioned synthesized-image generation unit) synthesizes information on the optical image inputted from the optical-image generation unit 401a and information on the radiation image inputted from the radiation-image generation unit 401c (i.e., superimposes the optical image and the radiation image) to generate information on a synthesized image, and outputs the information on the synthesized image to the display control unit 401e.

The display control unit 401e causes the image display device 404 to display the synthesized image on the basis of the information on the synthesized image which is inputted from the image synthesis unit 401d. Thus, the synthesized image, in which the optical image and the radiation image are superimposed, is displayed on the image display device 404 as illustrated in FIG. 3.

In addition, the display control unit 401e also has a function of causing the image display device 404 to display (as a panoramic image) multiple synthesized images which are generated by the image synthesis unit 401d, and causes the image display device 404 to display the multiple synthesized images in association with the rotation angles of the rotation unit 500. This function will be explained later.

The drive control unit 401f causes the rotation unit 500 to rotate in steps of a predetermined angle in response to command signals inputted from the input devices (including the keyboard 402 and the mouse 403). In addition, the drive control unit 401f outputs to the display control unit 401e rotation-angle information for use in the rotation. The rotation-angle information is referred to when the image synthesis unit 401d generates a panoramic image as explained later.

Figure 3:
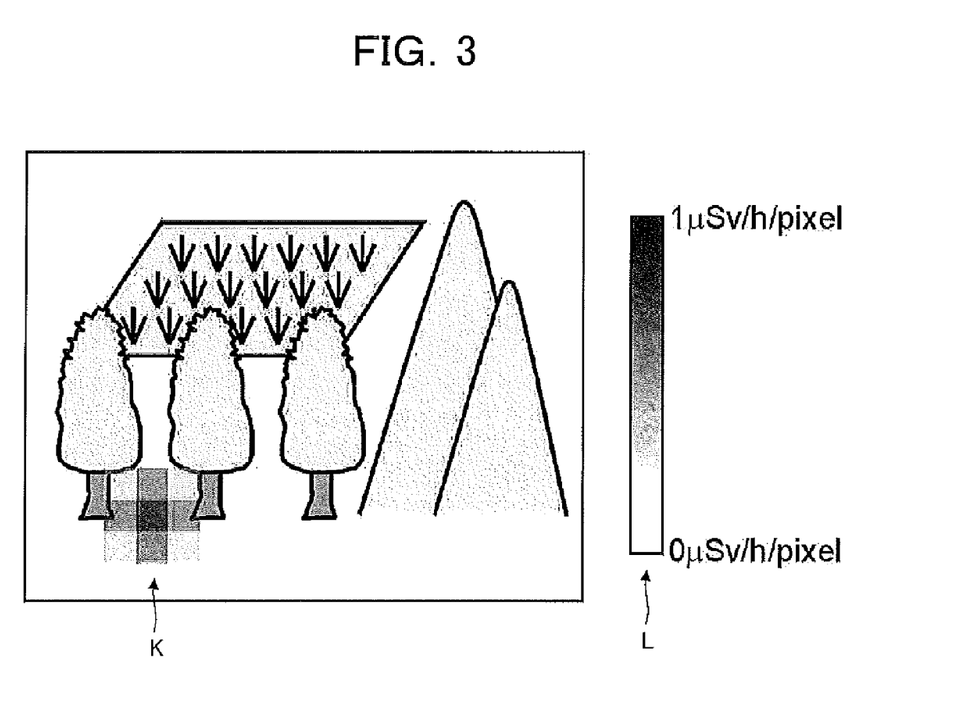
FIG. 3 is an explanatory diagram indicating a synthesized image obtained by superimposing a gamma-ray image and an optical image.

In the example of FIG. 3, it is possible to detect that a radiation source exists in the region indicated by the reference K in the synthesized image. In addition, information indicating a correspondence relationship between a contribution to the spatial dose rate by a radiation source and the gradation of each pixel is displayed on the right side of the synthesized image. (In FIG. 3, the above information is indicated by the reference L.) Thus, the user can visually recognize the location of the radiation source Q (as illustrated in FIG. 1).

In addition, the display control unit 401e successively connects the multiple synthesized images on the basis of the rotation-angle information inputted from the rotation unit 500, and outputs the concatenated image to the image display device 404. This operation will be explained later.

<Rotation Unit>

The rotation unit 500 illustrated in FIG. 1 can rotate, for example, in the right and left directions (in the horizontal direction), and changes the objective field of radiation measurement according to the rotation angle.

Figure 4:
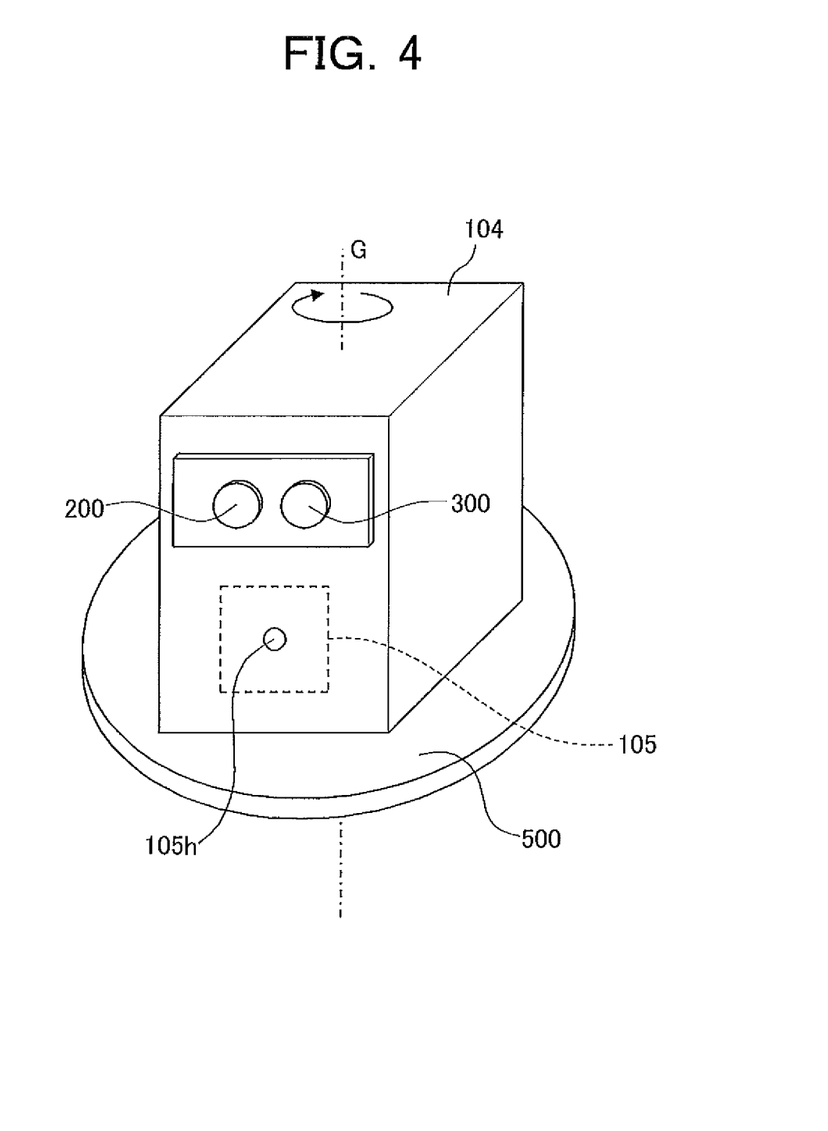
FIG. 4 is a perspective view of an assembly of a gamma camera, an optical camera, a distance meter, and a rotation unit.

FIG. 4 is a perspective view of an assembly of the gamma camera, the optical camera, the distance meter, and the rotation unit. The rotation unit 500 can rotate around the axis G in steps of the predetermined angle (e.g., 60 degrees) in accordance with control signals from the drive control unit 401f.

When the rotation unit 500, on which the gamma camera 100 (together with the shield 104) is mounted, rotates, the shield 104 also rotates. In other words, the gamma camera 100, together with the optical camera 200 and the distance meter 300 (which are attached to the shield 104), rotates while keeping the relative positions to the rotation unit 500 unchanged.

For example, when the angle of view in the horizontal direction of the gamma camera 100 is 60 degrees, the controller 401 performs six operations of radiation measurement by rotating the rotation unit 500 in steps of 60 degrees (which is equal to the angle of view). That is, an operation of radiation measurement and an operation of imaging are successively performed every time the controller 401 rotates in one step of 60 degrees.

Specifically, the controller 401 performs a first operation of radiation measurement in the initial orientation of the controller 401 in response to an input manipulation through the input devices (the keyboard 402 and the mouse 403 as illustrated in FIG. 1). That is, the controller 401 generates a radiation distribution image on the basis of the electric signals inputted from the gamma camera 100 and the distance information inputted from the distance meter 300, and generates a synthesized image by superimposing the radiation distribution image and the optical image acquired by the optical camera 200.

Next, the controller 401 causes the rotation unit 500 to rotate to the right by 60 degrees by driving a motor (not shown) such that the objective field (the objective field P2 illustrated in FIG. 5) adjacent to the objective field (the objective field P1 illustrated in FIG. 5) of the first operation of radiation measurement comes into the field of view of the gamma camera 100. In this state, the controller 401 performs a second operation of radiation measurement in a similar manner to the first operation of radiation measurement.

When the second operation of radiation measurement is completed, the controller 401 causes the rotation unit 500 to further rotate to the right by 60 degrees such that the objective field (the objective field P3 illustrated in FIG. 5) adjacent to the objective field of the second operation of radiation measurement comes into the field of view of the gamma camera 100. In this manner, the controller 401 performs the six operations of radiation measurement in succession.

Figure 5:
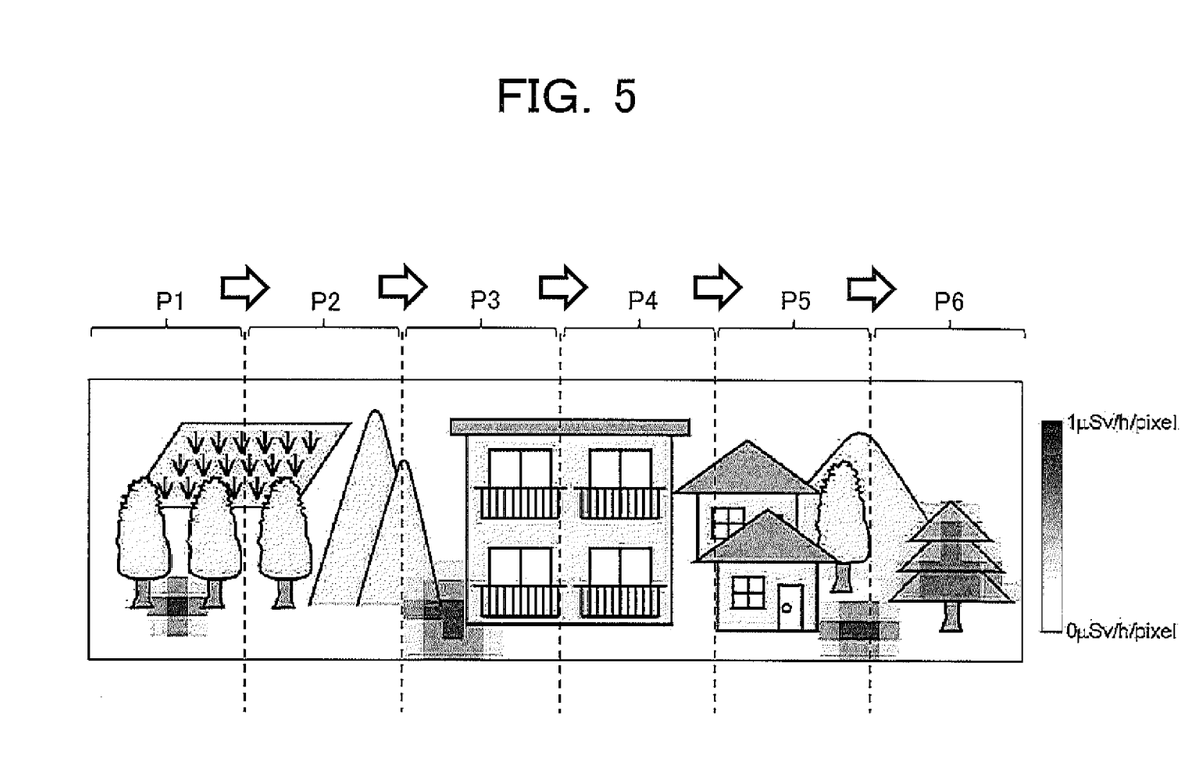
FIG. 5 is a diagram indicating an example of a screen displaying a synthesized image obtained by superimposing a gamma-ray image and an optical image which are generated by omnidirectional imaging.

Since the angle of view of the gamma camera 100 is 60 degrees as mentioned before, it is possible to acquire the gamma-ray images and the optical images of the objective fields P1 to P6 by causing the rotation unit 500 to horizontally rotate in steps of 60 degrees and performing the six operations of radiation measurement. Every time the imaging of one objective field is completed, the controller 401 generates information on a synthesized image based on the gamma-ray image and the optical image, and stores the generated information in a storage unit (not shown).

When the sixth operation of radiation measurement is completed, the controller 401 reads out the information on the synthesized image from the above storage unit, and generates a panoramic image by continuously concatenating the six synthesized images in the horizontal direction (in the real space). Then, the controller 401 causes the image display device 404 to display the above panoramic image.

Figure 6:
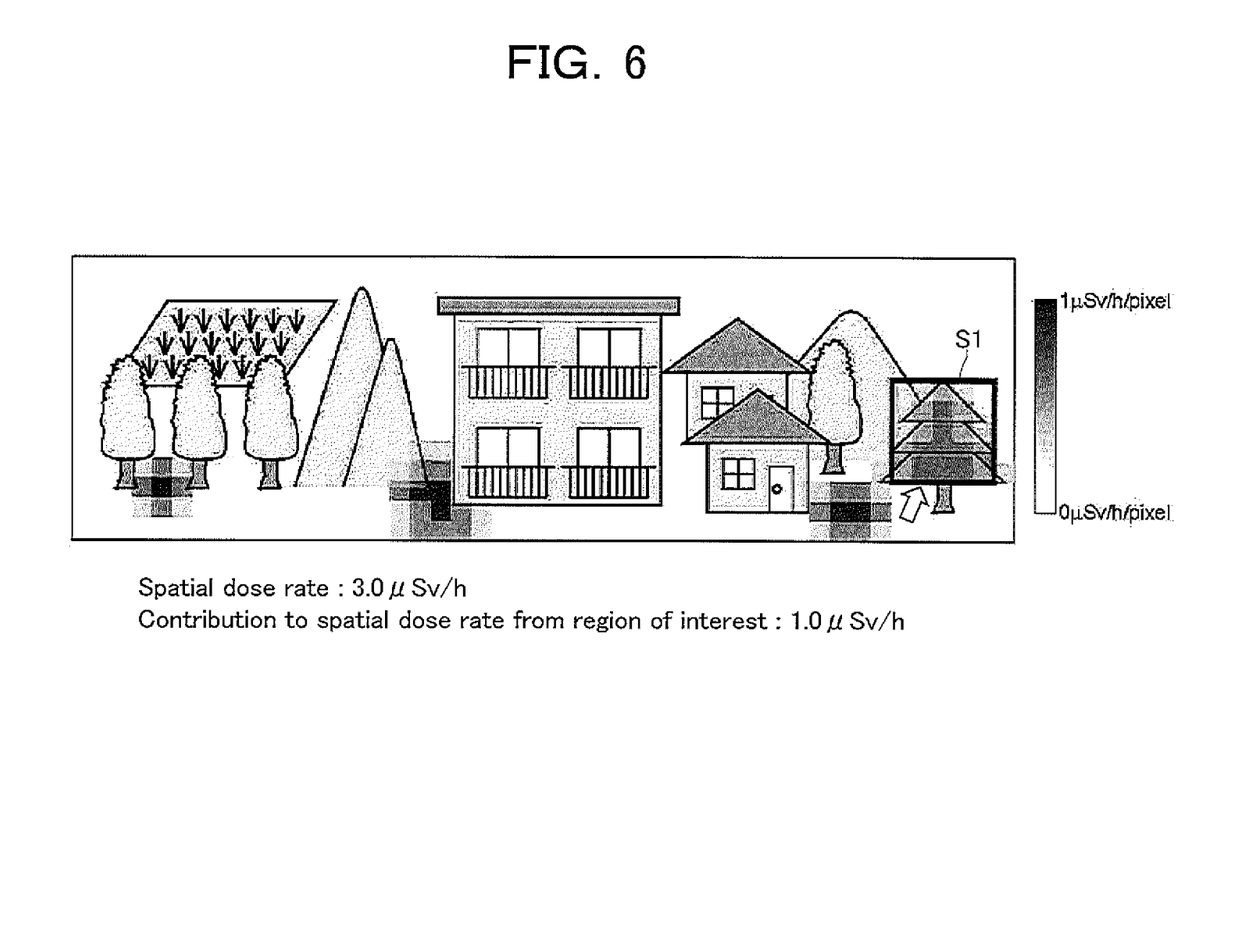
FIG. 6 is a diagram indicating an example of a screen displaying the spatial dose rate calculated by use of the synthesized image obtained by superimposing the gamma-ray image and the optical image which are generated by the omnidirectional imaging.

When the user sees the panoramic image (the omnidirectional (360-degree) superimposed image of the gamma-ray image and the optical image) as illustrated in FIG. 6, the user can accurately recognize the radiation doses in the objective fields P1 to P6 (illustrated in FIG. 5) surrounding the measurement point.

When the measurement is performed outdoors, the amount of gamma rays coming from the sky is small. Therefore, the spatial dose rate at the measurement point can be appropriately calculated by only the rotation in the horizontal direction (without tilting the radiation detector 101 in the vertical direction so as to cover the entire solid angle).

In addition, as illustrated by the reference S1 in FIG. 6, the controller 401 extracts one or more radiation regions in which the radiation is highly concentrated in the objective fields P1 to P6, and classifies the one or more radiation regions into one or more groups in a manner enabling selection from the one or more radiation regions through the input devices (e.g., the mouse 403 illustrated in FIG. 1). In the example of FIG. 5, four radiation regions exist in the objective fields P1 to P6.

In the above case, the controller 401 calculates a contribution to the spatial dose rate at the measurement point from a selected region S1, and displays the calculated contribution together with the spatial dose rate. As illustrated in FIG. 6, the controller 401 causes the image display device 404 to display indications, for example, "Spatial Dose Rate: 3.0 μSv/h" and "Contribution to Spatial Dose Rate from Region of Interest: 1.0 μSv/h". In this example, "Region of Interest" means the region S1 which is selected by the user through the input unit (the mouse 403 illustrated in FIG. 1).

Through the above operations, it is possible to obtain quantitative information indicating how much contribution to the spatial dose rate at the measurement point is made by a radiation source at what location.

<Advantages>

According to the present embodiment, it is possible to generate a synthesized image by superimposing a radiation image and an optical image on the basis of radiation distribution data inputted from the gamma camera 100 and optical image data inputted from the optical camera 200, and cause the image display device 404 to display the synthesized image.

Therefore, the user can recognize the accurate position of each radiation source and the radiation intensity at each radiation source in real time, and can therefore appropriately perform removal of and shielding from the radiation source.

In addition, according to the present embodiment, multiple synthesized images can be obtained by rotating the rotation unit 500 and measuring the radiation for every rotation of the predetermined rotation angle. Further, a panoramic image can be generated by concatenating the multiple synthesized images, and the image display device 404 can be caused to display the panoramic image. Therefore, the user can accurately recognize the distribution of the radiation sources in all azimuthal directions from the measurement point (in the all the regions surrounding the measurement point).

Further, according to the present embodiment, it is possible to calculate the spatial dose rate at the measurement point by using the omniazimuth distribution of the radiation sources around the measurement point, and cause the image display device 404 to display the spatial dose rate at the measurement point. Furthermore, the contribution to the spatial dose rate from the region of interest selected by the user (the region S1 illustrated in FIG. 6) is obtained, and displayed together with the spatial dose rate on the image display device 404. Therefore, the user can easily obtain the quantitative information indicating how much contribution to the spatial dose rate at the measurement point is made by a radiation source at what location.

As explained above, according to the present embodiment, it is possible to make an estimate of the degree of lowering of the spatial dose rate by removal or shielding of a specific radiation source, or a work plan indicating which radiation source is to be removed or shielded in order to achieve a target spatial dose rate. Therefore, the present embodiment can provide a guideline for an operation of reducing the spatial dose rate for improving the work or life environment.

Variation

Although the radiation measurement apparatus according to the present invention is explained by using the above embodiment, the radiation measurement apparatus according to the present invention is not limited to the above embodiment, and various variations are possible.

For example, although the rotation unit 500 rotates in only the right and left direction (horizontal direction) in the explained embodiment, the rotation direction is not limited to the horizontal direction. For example, the rotation unit 500 may be configured to be able to tilt in the vertical direction as well as the rotation in the horizontal direction.

In the above case, it is possible to acquire the gamma-ray image and the optical image in the entire solid angle (of $4\pi$), and the spatial dose rate at the measurement point can be accurately obtained by adding up the contributions to the spatial dose rate at the measurement point from the spherical region having the center at the measurement point.

Further, the radiation measurement apparatus A according to the explained embodiment may also have a receiver 11 which receives signals for determining the radiation measurement position by the global positioning system (GPS). In this case, the controller 401 determines the radiation measurement position (i.e., the location of the radiation measurement apparatus A) on the basis of the signals received by the receiver, and stores in the storage unit (MEM) 12 the radiation measurement position the measurement position (GPS position P1 to Pn) in association with the spatial dose rates as the measurement data as shown in FIG. 8. The measurement data may include the radiation image data and optical image data, data of the compass 13.

In the above case, when measurement is performed at multiple positions outdoors, it is possible to save the work for recording the positions at which information is obtained. In addition, when the radiation sources are distributed over a wide range, it is also possible to combine the obtained information with map data, plot the distribution of the radiation sources on the map data, and visualize the distribution of the radiation sources.

Alternatively, it is possible to arrange a compass instead of the provision for the global positioning system. In this arrangement, when the rotation unit 500 is manually rotated, the user can recognize the axis direction of the aperture 105*h* arranged in the gamma camera 100, and can appropriately measure the radiation doses from all the azimuthal directions around the measurement point.

Further alternatively, it is possible to arrange a compass 13 in addition to the provision for the global positioning system. In this case, the location of the radiation measurement apparatus A is determined by the global positioning system, and the azimuthal direction of the aperture 105*h* is determined by the compass 13 as the measurement data. Therefore, it is possible to determine which region on the map is measured by the radiation measurement apparatus A. In this case, the controller 401 receives information (azimuthal information) indicating the azimuthal direction in which the aperture 105*h* faces, in response to a manipulation by the user through the input unit (the keyboard 402 and the mouse 403 illustrated in FIG. 1). Then, every time an operation of radiation measurement is performed, the controller 401 stores information (location information) on the location of the radiation measurement apparatus A and the azimuthal information in association with the spatial dose rates at the location of the radiation measurement apparatus A. When the information stored in the above storage unit is used, it is possible to easily produce map data indicating the radiation distribution.

Yet further alternatively, a geomagnetism sensor (as the azimuthal-direction detection unit) may be arranged instead of the compass. In this case, every time an operation of radiation measurement is performed, the controller 401 receives azimuthal information which is inputted from the geomagnetism sensor.

In addition, according to the explained embodiment, the absolute value (in $\mu$Sv/h) of the contribution to the spatial dose rate at the measurement point is obtained by calculation for the region of interest (the region S1 illustrated in FIG. 6) selected through the input unit (the keyboard 402 and the mouse 403). However, the contribution need not be obtained as the absolute value. For example, the contribution to the spatial dose rate at the measurement point may be calculated as a relative value (in %) to the spatial dose rate.

Further, even in the case where the radiation detector 101 is surrounded by the shield 104, highly penetrating radiations such as cosmic rays can pass through the shield 104 and become a background.

In order to reduce the influence of the above background and perform the measurement with higher precision, the background may also be measured. In this case, the background measurement is performed by placing a shield so as to block up the aperture 105h in the pinhole collimator 105. Thereafter, the radiation is detected with the aperture 105h open, and the detection result of the background measurement is subtracted from the result of the radiation measurement. Thus, the influence of the background is canceled.

In the case where the contribution to the spatial dose rate at the measurement point from a certain direction is known in advance to be small, the spatial dose rates and the breakdown of the spatial dose rates (contributions from the respective regions) can be calculated even when gamma-ray images are not acquired from all the azimuthal directions.

According to the explained embodiment, the rotation unit 500 automatically rotates when an operation of radiation measurement is completed. However, the rotation of the rotation unit 500 is not necessarily automatically performed. For example, the radiation measurement apparatus A may be configured to allow the user to manually rotate the rotation unit 500 for every measurement operation, and manipulate the radiation measurement apparatus A through the input devices for starting an operation of radiation measurement.

Figure 7:
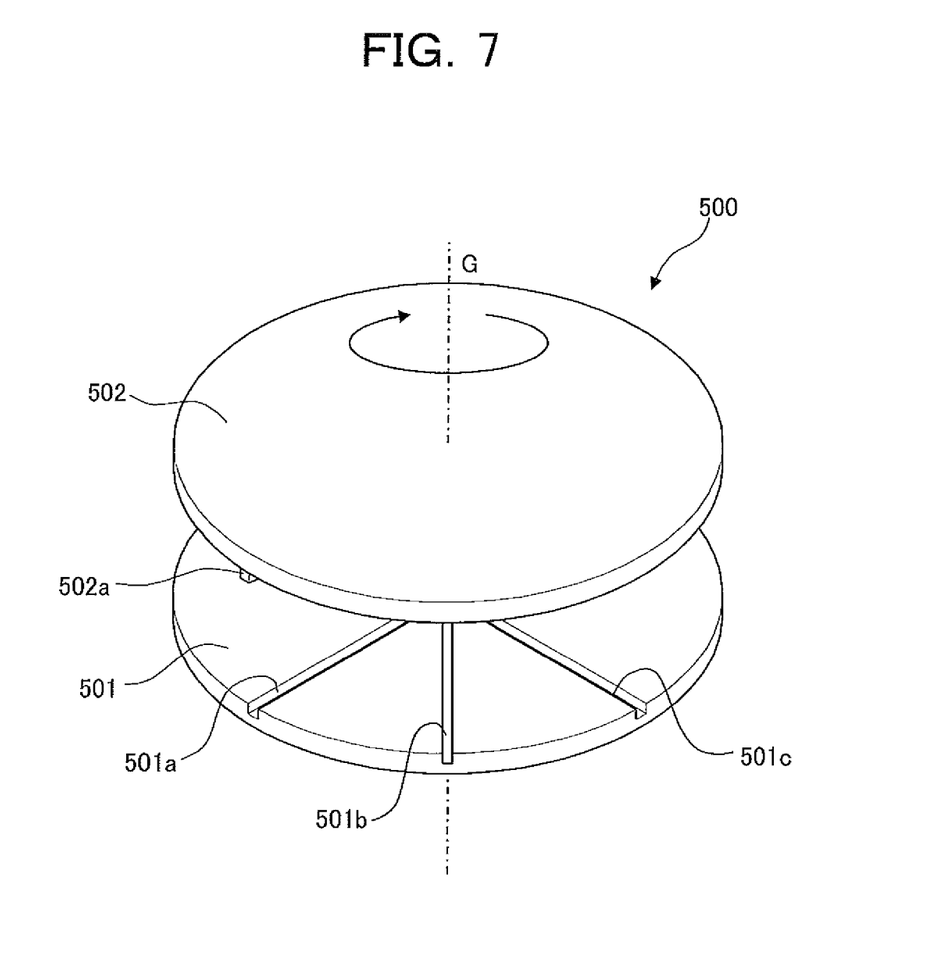
FIG. 7 is a (schematic) exploded perspective view of the rotation unit in a radiation measurement apparatus as a variation of the embodiment of the present invention.

In this case, the rotation unit 500 is preferably configured to be easily rotated by a specified angle (e.g., 60 degrees). FIG. 7 is a (schematic) exploded perspective view of the rotation unit in a radiation measurement apparatus as a variation of the embodiment of the present invention.

The rotation unit 500 of FIG. 7 includes a support member 501 and a rotation member 502, which each have a disk-like shape and are concentrically assembled. The support member 501 supports the rotation member 502 from the underside of the rotation member 502. The rotation member 502 is configured to rotate by a predetermined angle (e.g., 60 degrees) in response to a manipulation by the user.

In the example of FIG. 7, six grooves 501a, 501b, . . . , 501f extending in six radial directions the adjacent ones of which makes an angle of 60 degrees. The six grooves 501a, 501b, . . . , 501f face upward when the radiation measurement apparatus A is placed.

On the other hand, protrusions 502a protruding downward and having shapes corresponding to the shapes of the grooves are arranged on the underside of the rotation member 502. Therefore, the user can easily fix the rotation member 502 at the positions corresponding to the grooves 501a, 501b, . . . , 501f.

Alternatively, instead of arranging the grooves 501a, 501b, . . . , 501f and the protrusions 502a, marks may be put on the rotation member 502 in steps of 60 degrees such that the user can manually rotate the rotation member 502 by using the marks as a guide.

The rotation angle of the rotation unit 500 need not correspond to the angle of view of the gamma camera 100 in the horizontal direction, and may be set smaller than the angle of view of the gamma camera 100 in the horizontal direction. For example, in the case where the angle of view of the gamma camera 100 is 60 degrees, the rotation unit 500 may be rotated in steps of 51 degrees such that the full azimuth range can be covered by seven measurement operations. In this case, two adjacent gamma-ray images overlap in the near-edge portions of the two adjacent fields of view, and therefore an average of the results of the two measurement operations is used in the overlapped portions. Thus, the precision in the measurement can be further improved.

Furthermore, the radiation measurement apparatus A may include more than one radiation detector 101. For example, the radiation measurement apparatus A may include multiple sets of a radiation detector and a pinhole collimator, where each set has a field of view in a different direction. For example, in the case where two sets of a radiation detector and a pinhole collimator are mounted back to back, the number of operations of radiation measurement can be reduced to three, so that the spatial dose rate at the measurement point can be calculated in half time.

In addition, according to the explained embodiment, the pinhole optical system using the pinhole collimator 105 is used as a means for detecting the incident directions of the gamma rays. However, the means for detecting the incident directions of the gamma rays need not be the pinhole optical system. For example, functions similar to the explained embodiment can be realized by using optical systems utilizing a multi-pinhole collimator, a coded aperture mask, or a Compton kinematics.

Further, according to the explained embodiment, the optical camera 200, which acquires information on a planar image, is used. However, the optical camera need not be such a type. For example, an optical camera which can acquire a three-dimensional image may be used. In this case, when the image display device 404 is configured to be able to display a three-dimensional image, the user can more easily recognize the distribution of radiation sources.

For example, in the case where an optical system using a coded aperture mask is used, the radiation image can also be acquired as a three-dimensional image. Although the three-dimensional radiation image cannot be obtained in the case where the pinhole optical system is used, it is possible to estimate the positions of radiation sources and superimpose the optical image and the radiation image. In this case, the positions of radiation sources may be estimated, for example, on the basis of values obtained by the distance meter 300, or on the basis of the consideration that a radiation source exists at the point at which a straight line extending along the incident direction of gamma rays meets a structure (e.g., a wall or the ground) in a three-dimensional image obtained by the optical camera.

Furthermore, although the controller 401 calculates the spatial dose rate and causes the image display device 404 to display the spatial dose rate in the explained embodiment, the displayed information is not limited to the spatial dose rate. For example, the controller 401 may detect the energy of each radiation injected through the aperture 105h, and causes the image display device 404 to display the energy distribution of the radiations. In this case, it is possible to accurately recognize the energy distribution of the radiations.

Moreover, although the gamma rays are detected as the radiations in the explained embodiment, the radiations need not be limited to the gamma rays, and another type of radiations (e.g., neutron beams) may be detected.

According to the embodiments above, there is provided a radiation measurement apparatus comprising:

a radiation detector which detects incoming a radiation in a field of view;

a measurement processing unit which measures a distribution of a radiation source in an object on the basis of a detection signal inputted from the radiation detector;

an optical camera which takes an optical image of the object existing in the field of view;

a synthesized-image generation unit which generates a synthesized images by superimposing the distribution of the radiation source measured by the measurement processing unit and the optical image inputted from the optical camera;

a rotation unit which changes an objective field of radiation measurement by automatically or manually rotating the field of view; and a display control unit which causes a display unit to display, in association with rotation angles of the rotation unit, first and second of the synthesized images generated at first and second of the rotational angles being different each other, respectively.

What is claimed is:

1. A radiation measurement apparatus comprising:
   a gamma camera which detects incoming radiation in a first field of view and measures a distribution of the radiation in the first field of view;
   an optical camera which takes an optical image in a second field of view;
   a rotation unit to which the gamma camera and the optical camera are connected, and which allows the gamma camera and the optical camera to rotate together while maintaining a location thereof so that the first field of view and the second field of view correspond to a plurality of objective fields;
   a processor connected to the gamma camera, the optical camera, and the rotation unit; and
   a storage medium which stores instructions that, when executed by the processor, cause the processor to:
   generate a plurality of radiation distribution images with the gamma camera in association with rotation of the rotation unit, where the radiation distribution images correspond to different one of the objective fields,
   take a plurality of optical images with the optical camera which is rotated together with the gamma camera in association with rotation of the rotation unit, where the optical images correspond to said ones of the objective fields,
   generate a plurality of synthesized images by superimposing the radiation distribution images and the optical images, where the synthesized images correspond to said ones of the objective fields,
   generate a panoramic image including each of the objective fields by concatenating the synthesized images,
   calculate a spatial dose rate of the radiation in the panoramic image, and
   display, in association with rotation angles of the rotation unit, the panoramic image on a display device,
   wherein the panoramic image represents a 360° view of the objective fields.

2. The radiation measurement apparatus according to claim 1, wherein the storage medium further stores instructions that, when executed by the processor, cause the processor to:
   calculate a contribution, to the spatial dose rate, of the radiation corresponding to a region identified in the panoramic image by an input unit, and
   display the contribution on the display device.

3. The radiation measurement apparatus according to claim 1, further comprising:
   a satellite positioning system receiver which receives signals for determining a radiation measurement position; and
   an azimuth detection device which detects an azimuth of the objective fields,
   wherein the storage medium further stores instructions that, when executed by the processor, cause the processor to:
   generate location information indicating a location of the gamma camera on the basis of the signals received by the satellite positioning receiver,
   receive azimuthal information from the azimuth detection device, and
   store the location information and the azimuthal information in association with the spatial dose rate at the location in the storage medium.

4. The radiation measurement apparatus according to claim 1, wherein the rotation unit rotates the gamma camera and the optical camera together in a horizontal direction.

5. The radiation measurement apparatus according to claim 4, wherein the storage medium further stores instructions that, when executed by the processor, cause the processor to:
   rotate the rotation unit by a preset rotation angle in steps,
   measure a distribution of the radiation from one or more radiation sources every time the rotation unit is rotated, and
   take the optical images of the one or more radiation sources after the rotation unit is rotated.

6. The radiation measurement apparatus according to claim 5, wherein the gamma camera includes a two-dimensional radiation detector, and
   wherein the distribution of the radiation measured by the gamma camera corresponds to one or more radiation sources.

7. The radiation measurement apparatus according to claim 1, wherein the gamma camera includes a semiconductor radiation detector which includes a plurality of semiconductor elements which detect the radiation.

8. The radiation measurement apparatus according to claim 1, wherein the gamma camera includes a pinhole collimator.

9. The radiation measurement apparatus according to claim 1, further comprising:
   a radiation shield in which the gamma camera is disposed,
   wherein the gamma camera includes an aperture which allows the radiation to pass through the radiation shield, and
   wherein the gamma camera includes a two-dimensional radiation detector which detects the radiation incident through the aperture.

10. The radiation measurement apparatus according to claim 1,
    wherein the gamma camera and the optical camera are mounted on the rotation unit,
    wherein the gamma camera and the optical camera are disposed separately on the rotation unit,
    wherein the rotation unit allows the gamma camera and the optical camera to rotate around an axis, and
    wherein the storage medium further stores instructions that, when executed by the processor, cause the processor to:
    rotate the gamma camera and the optical camera together 360° through the objective fields, where each of the first field of view and the second field of view is less than 360°.

11. A radiation measurement method comprising:
    rotating a gamma camera which detects incoming radiation in a first field of view and measures a distribution of the radiation in the first field of view together with an optical camera which takes an optical image in a second field of view so that the first field of view and the second field of view correspond to a plurality of objective fields while maintaining a location of the gamma camera and the optical camera;
    generating a plurality of radiation distribution images with the gamma camera in association with said rotating, where the radiation distribution images correspond to different ones of the objective fields;
    taking a plurality of optical images with the optical camera which is rotated together with the gamma camera in association with said rotating, where the optical images correspond to said one of the objective fields,
    generating a plurality of synthesized images by superimposing the radiation distribution images and the optical images, where the synthesized images correspond to said ones of the objective fields;

generating a panoramic image that includes each of the objective fields by concatenating the synthesized images;

calculating a spatial dose rate of the radiation in the panoramic image; and displaying the panoramic image in association with rotation angles of rotation of the gamma camera and the optical camera, wherein the panoramic image represents a 360° view of the objective fields.

12. The radiation measurement method according to claim 11, wherein:

the gamma camera is placed inside a radiation shield which has a pinhole collimator through with the radiation passes to the gamma camera.

* * * * *